Feb. 24, 1970    J. SMITH ET AL    3,497,827
GAS LASER UTILIZING THE NEGATIVE GLOW IN
A COLD CATHODE GLOW DISCHARGE TUBE
Filed Sept. 21, 1964    2 Sheets-Sheet 1

INVENTORS
J. SMITH &
D.G. SIMMONS
BY
Frank R. Trifari
AGENT

United States Patent Office 3,497,827
Patented Feb. 24, 1970

3,497,827
GAS LASER UTILIZING THE NEGATIVE GLOW IN A COLD CATHODE GLOW DISCHARGE TUBE
James Smith, Redhill, Surrey, and Derrick George Simmons, South Merstham, Surrey, England, assignors, by mesne assignments, to U.S. Philips Corporation, New York, N.Y., a corporation of Delaware
Filed Sept. 21, 1964, Ser. No. 397,731
Claims priority, application Great Britain, Sept. 23, 1963, 37,322/63
Int. Cl. H01s 3/22
U.S. Cl. 331—94.5                       14 Claims

ABSTRACT OF THE DISCLOSURE

A gas laser is disclosed which employs the negative glow of a cold cathode glow discharge between a cathode and an external anode to produce a population inversion. Reflectors are also employed at both ends of an envelope containing the cathode and anode and a gaseous atmosphere therein to aid in producing a laser beam along a path extending into the region occupied, in operation, by the negative glow portion of the discharge.

---

This invention relates to lasers, or as they are also called, optical masers, which can be used to amplify or modulate light signals or to generate light signals.

This invention relates particularly but not exclusively to gas lasers wherein a glow-discharge may be maintained within a substantially cylindrical tubular envelope, and wherein the laser beam extends in operation along the envelope parallel to the longitudinal axis of the envelope. In such devices the glow-discharge can be maintained with the aid of a thermionic cathode or with the aid of a "cold" cathode; the present invention is concerned with lasers having a cold-cathode glow-discharge.

The invention provides a cold-cathode glow-discharge laser comprising an envelope containing a gaseous atmosphere, said envelope also containing a cathode and an anode for cooperating to produce the glow discharge and hence population inversion in said atmosphere, the laser also comprising means for producing a laser beam along a path extending into the region occupied, in operation, by the negative glow portion of the discharge.

The path of the laser beam may also extend into some other portions of the discharge space, e.g. into the dark spaces on either side of the negative glow.

The negative glow may occupy a region adjacent a flat surface of the cathode, alternatively the cathode may be tubular so that in operation a "hollow-cathode" effect is produced, the negative glow substantially filling the interior of the tubular cathode through which the path of the laser beam extends.

The laser may comprise a plurality of aligned sections each arranged to cooperate with the laser beam and each comprising a separate anode and a separate cathode. In such an arrangement barrier means may be provided between adjacent sections to inhibit the formation of a discharge between the anode of one section and the cathode of an adjacent section.

Figure 1:
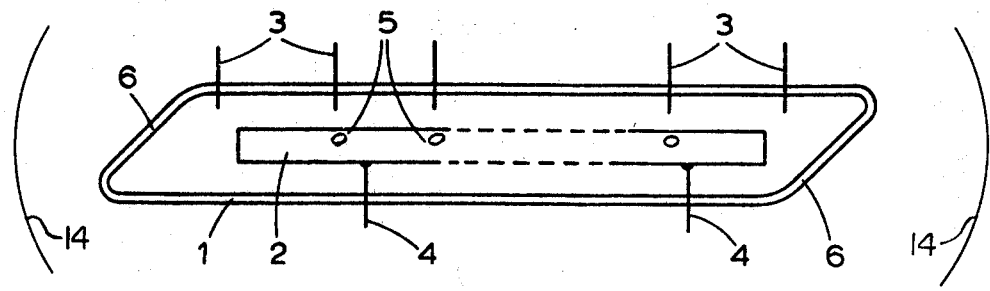
Figure 2:
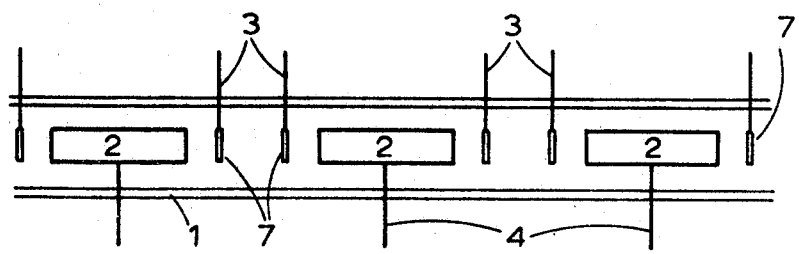
Figure 3:
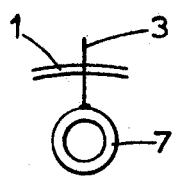
Figure 5:
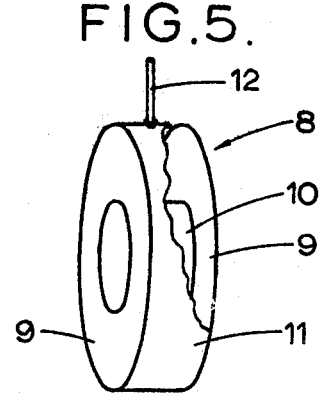
Figure 4:
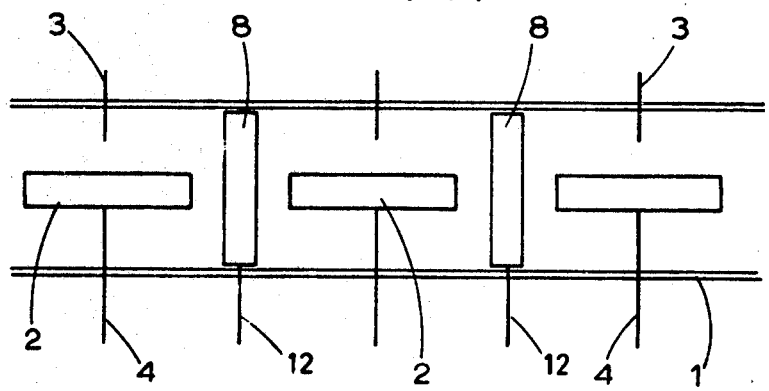
Figure 6:
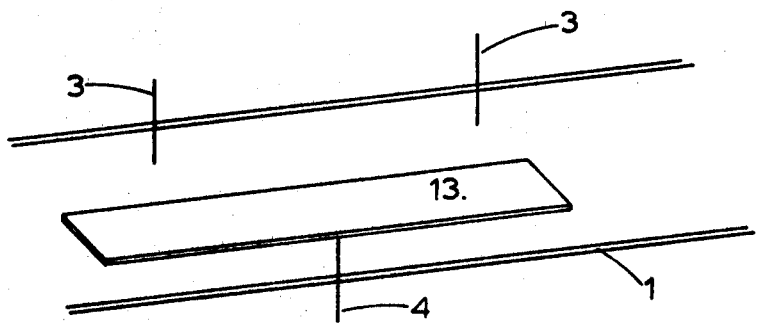

The invention will be described with reference to the accompanying drawings in which:
FIGURE 1 illustrates a first embodiment,
FIGURES 2 and 3 illustrate a second embodiment,
FIGURES 4 and 5 illustrate a third embodiment,
FIGURE 6 illustrates a fourth embodiment of a laser according to the invention.

Referring to FIGURE 1 a substantially cylindrical envelope 1 surrounds an electrode arrangement formed by a tubular cylindrical cathode 2 and a number of anode rods 3. The anode rods extend through the envelope in a gas-tight manner so that their external portions form connection pins and one or more similar rods 4 are electrically connected to the cathode 2 and also extend through the envelope 1.

The envelope 1 is preferably formed of glass having a coefficient of expansion closely similar to that of the material of the rods 3 and 4 in order that satisfactory gas-tight seals can be made between the rods and the glass; for instance, if "Kodial" glass is used the rods suitably may be made of an alloy including iron, nickel and cobalt. The cathode 1 has a row of apertures 5 formed in it; an anode rod 3 is arranged adjacent each aperture and an anode rod is also arranged at each end of the cathode. Electrically conducting discs (not shown) may also be provided on the ends of the anode rods inside the envelope in order to provide additional areas of conductor to which the current discharge may take place in operation and to dissipate the heat generated. These discs preferably lie in a plane substantially normal to the rods.

At each end of the envelope is a Brewster-angle window 6 and in operation the laser beam extends through these two windows through the tubular cathode in the region of the cathode glow. The envelope is filled with, for example, a gas mixture of neon and helium at a pressure of several millimetres, for example 10 to 80 mm., of mercury.

When the anodes are connected to the positive terminal of a current source and the cathode is connected to the negative terminal of the source then a discharge will be initiated and a negative glow will be formed of which the major part resides within the cathode tube. The discharge will be in the form of a plurality of paths; the end discharge paths each extend from an end anode into the open end of the cathode tube and intermediate discharge-paths each extend from an anode through the adjacent aperture 5 to the interior of the cathode tube. The provision of several anodes tends to ensure that the glow is evenly-distributed along the interior of the cathode tube and this tendency can be greatly enhanced by connecting each anode through a respective current-limiting resistor to the positive supply terminal. In an experimental device constructed in this manner the cathode tube had a diameter of 7 mm. and was 30 mm. long; the anode to cathode operating voltage was about 150 volts. The anode rods each comprised 1.5 mm. diameter wire which was 30 mm. long with about 8 mm. inside the envelope for taking current from the discharge. These rods were provided in addition with anode discs of about 7 mm. diameter.

One important difference between lasers which utilize the negative glow and those known devices which utilize the positive column part of a glow discharge is that, if it is required to increase the laser length by a factor of 2 and yet keep the gain per unit length constant, in the case of the "negative glow" laser the applied voltage would remain constant but the current would have to be doubled in order to keep the cathode current density constant whereas, in the case of the "positive column" laser, the current would be held constant but the applied voltage would have to be approximately doubled in order to keep the voltage gradient along the discharge constant. Thus the "negative glow" laser is usually a low voltage, high current device and the "positive column" laser is a high voltage, low current device. Typical values for a 1 metre device are 150 volts, 1 amp for the negative glow laser and 1200 volts, 40 ma. for the positive column laser.

The applied voltage necessary for initiation of the discharge in the negative glow laser is dependent on the anode-cathode spacing and is typically a few hundred volts. It can be reduced if necessary by the incorporation of an auxiliary "trigger" electrode, situated close to the cathode and connected externally to the anode via a high value, for example 1 megohm resistor. In the case of the positive column laser a starting voltage of several kilovolts is required unless use is made of an auxiliary high frequency "Tesla" discharge.

In a device using a negative glow nearly all the anode to cathode voltage can appear between the cathode and the glowing ionised layer. Thus, in the device described with reference to FIGURE 1, electrons entering the negative glow region will normally have much greater energies than those in the positive column of a positive column laser.

In gas lasers as hitherto designed, it has been usual to make the envelope of a very pure material such as quartz, because ions from the positive column glow impinge upon the inner surface of the envelope and release into the gaseous atmosphere impurities contained in the material of the envelope: these impurities tend to poison the gaseous atmosphere. In a negative-glow tubular cathode laser, for example, as described above, the major part of the negative glow is confined within the cathode. If a substantially flat cathode is used instead, for example as described below with reference to FIGURE 6, the major part of the negative glow is confined closely adjacent the cathode. Thus, in both these cases, ions from the glow are not so likely to impinge upon the wall of the envelope 1: this means that it is no longer necessary to use a material as pure as quartz for the envelope in order to prevent poisoning of the gas atmosphere within the envelope. More impurities may be present in the envelope material without prejudicing the operation of the device.

As in most cold-cathode glow-discharge devices in use, material from the surface of the cathode tends to be sputtered onto the adjacent surface of the envelope wall: because the tubular cathode has such a large surface area and extends along the active portion of the laser, a large area of the envelope inner wall is covered with a layer of sputtered material which in operation is continuously being added to and which acts as a getter and tends to keep the gas atmosphere clean even when the tube is not operating. The area of this gettering surface is of course very much greater than that which may be obtained in lasers using a positive column glow. It is also difficult to continually add to the gettering surface in a laser using a positive column glow.

FIGURE 2 illustrates a second embodiment in which a plurality of tubular cathodes 2 are arranged in line along the device. Each cathode 2 has a separate connecting rod 4 and at each end of each cathode is an anode in the form of an annular disc 7 supported by a connecting rod 3 as also illustrated in FIGURE 3. This arrangement provides for individual control of each of a number of separate sections of the laser so that each section may be used independently to switch or amplitude-modulate the laser beam.

FIGURE 4 illustrates a third embodiment in which the anodes are again in rod form as in the embodiment illustrated in FIGURE 1 and may again be provided with anode discs. These anodes co-operate with a plurality of tubular cathodes similar to those illustrated in FIGURE 2. The cathodes may be provided with apertures similar to those shown in FIGURE 1, especially if the cathodes are fairly long. If they are short then apertures are often not necessary. In order to prevent the anode of one anode-cathode section of the laser from forming a discharge with the cathode of another section a barrier electrode 8 is interposed between each two adjacent sections. As can be seen more clearly in FIGURE 5 each of these barrier electrodes is in the form of two flat annuli 9 joined by two concentric cylindrical tube portions 10 and 11; a connecting rod 12 secured to the cylindrical portion 11 extends through the wall of the envelope 1. If desired the cylindrical portion 11 can be omitted and the rod 12 may then be secured to the outer surface of the portion 10. In operation each barrier electrode 8 is maintained at a potential approximately midway between the potentials of the cathodes and anodes; if as in the embodiment illustrated in FIGURE 1, the anode/cathode voltage drops are in the region of 150 volts then the barrier electrodes may suitably be maintained at 75 volts positive with respect to the cathodes by returning them to a suitable positive terminal on the supply source. The barrier electrodes will then inhibit discharges between adjacent cathode-anode sections of the laser.

In an experimental arrangement using a tube as illustrated in FIGURE 4 the tube comprised nine tubular cathodes 2 each with its associated anode 3. The tube was filled with a mixture of 100 parts helium and 1 part neon at a total pressure of 12 mm. of mercury. With an anode to cathode voltage of 150 volts the total current was 2.25 amps; as each of the nine cathodes was 10 cm. long this gave a current of substantially 25 milliamps per centimetre of cathode length. At each end of the tube was positioned a spherical concave mirror having a radius of curvature of 120 cm. these mirrors being spaced 150 cm. apart. The laser beam produced by this arrangement at a power of the order of several hundred microwatts had a wavelength of 1.153 microns.

A further experiment used the same arrangement but connections were only made to three of the cathodes and anodes so as to use, in effect, only a three-section tube; the total current was 350 milliamps, that is to say approximately 12 milliamps per centimetre of cathode length. The mirror arrangement was the same as before as also was the wavelength of the generated light in the laser beam.

Experiments made using the same arrangement but with various gas mixtures having helium-neon ratios varying from 10:1 to 1000:1 at total pressurees from 3 to 35 mm. of mercury also produced a laser beam of the same wavelength.

For comparison it is useful to note that in positive-column tubes the mixture is usually of the order of 10 parts of helium to 1 part of neon with total pressure of the order of 1 mm. of mercury.

The embodiment illustrated in FIGURE 6 incorporates a flat cathode plate 13. At low discharge currents the negative glow will be adjacent the upper surface of the plate; as the current is increased the glow may extend to the other side of the plate. If desired, the lower side of the plate as viewed in the figure may be coated with a layer of insulating material in order to inhibit this spreading. The laser beam travels along the top of the cathode through the negative glow region and preferably is of substantially rectangular cross-section. The cathode can be in the form of a single plate as illustrated in FIGURE 6 or can be composed of a number of separate sheets arranged in succession in a similar manner to the separate cathodes of the embodiments illustrated in FIGURES 2 and 4 with, if desired, suitable barrier electrodes between them. Anode rods 3 are provided in a similar manner to the embodiments described previously and may again be provided with anode discs.

As an example, in a specific embodiment constructed so as to resemble that described with reference to FIGURE 6 the cathode comprised ten separate sheets 13 of molybdenum each measuring 5 cm. long by 5 mm. wide. these sheets were arranged end to end 10 mm. apart, substantially in the same plane, and substantially along a common axis.

Two anode rods 3 were arranged to cooperate with each cathode. These anode rods each comprised 1.5 mm. diameter wire which was 30 mm. long with about 8 mm. inside the envelope for taking current from the discharge. These rods were provided at their ends inside the envelope with anode discs of about 7 mm. diameter as described above with reference to FIGURE 1, these discs being approximately parallel to the cathode sheets and about 6 mm. from them.

Barrier electrodes were provided approximately midway between each of the cathode plates. These electrodes each comprised two metal washers of 15 mm. diameter provided at their centres with holes of 7 mm. diameter. These two washers were spaced apart with metal spacers 2.5 mm. thick so as to leave the central holes clear. The electrodes were each provided with supporting connecting rods which serve to connect them to terminals outside the "Kodial" glass envelope 1. The central holes were aligned so as to give, in operation, the laser beam a clear path through them which path included at least part of the regions occupied by the negative glow portions of the discharges from the cathodes.

The envelope 1 was provided with Brewster angle windows at its ends. Outside each of these windows was disposed a spherical concave slightly transmissive multilayer dichroic mirror 14 in the usual manner. These mirrors were constructed for peak reflection at $1.153\mu$.

Best results were obtained when the envelope was filled with a mixture containing 0.5 to 5% neon and 99.5 to 95% helium at a total pressure of between 10 and 80 mm. of mercury. The optimum total pressure was found to be 20 to 30 mm. Hg. At this total pressure and when using a mixture of 2% Ne and 98% He as the filling laser output at $1.153\mu$ was obtained when the total discharge current reached 100 ma. (two ma. per cm. of cathode length) from a D.C. power supply. When using a mixture of 99% He and 1% Ne at a total pressure of 27 mm. Hg, 1.7 mw. of laser output power was obtained with a total discharge current of 1.1 ampere from a D.C. power supply.

It was also found to be possible to obtain about the same average laser output power using an A.C. power supply.

If the dichroic mirrors were replaced by spherical concave mirrors coated with aluminum film it was also possible to obtain laser output at $1.153\mu$.

The barrier electrodes were found to be most useful in all the embodiments when the laser was initially operated, i.e. during the time when cleaning of the gas filling and cathodes was occurring by the action of sputtering the surface layer of cathode material on the wall of the envelope. During this time they were connected to an electric potential approximately midway between that of the cathodes and anodes. After this cleaning has progressed sufficiently it was possible to leave them electrically "floating" without adversely affecting the laser operation.

The embodiments described are applicable to the production of continuous laser beams and to production of pulsed beams. Pulsed beams may be obtained by applying sinusoidal A.C. or a pulse supply between the anodes and cathodes. If the discharge current supply is alternating in sign the tube may be made to act effectively as its own rectifier.

Although the embodiments described have incorporated spherical concave mirrors this is not necessarily so. These mirrors may normally be replaced by any concave curved mirror which has the desired reflectance, or even by flat mirrors. A type of concave mirror which may be used, if a beam which is substantially rectangular in cross-section is required, is the cylindrical concave mirror. If, for example, a mirror of this type were incorporated in the embodiment shown in FIGURE 6 it should preferably be placed so that its axis having infinite radius of curvature is substantially parallel to the shorter edge of the cathode plate. Combinations of cylindrical concave and/or spherical concave and/or flat mirrors may also be used.

What we claim is:

1. A cold-cathode glow-discharge laser comprising an envelope containing a gaseous atmosphere at a pressure for sustaining a population inversion, a cathode and an anode external to the cathode within said envelope producing a glow discharge and hence a population inversion in said atmosphere, the negative glow portion of said discharge defining a path for a laser beam, said path extending into and along the region occupied, in operation, by the negative glow portion of the discharge.

2. A laser as claimed in claim 1 wherein the cathode is of cylindrical form, said path extending inside said cylinder.

3. A laser as claimed in claim 2 wherein the anode comprises an anode rod substantially normal to and not extending as far as the axis of the cylindrical cathode and situated outside the end of the cathode.

4. A laser as claimed in claim 2 wherein the anode comprises an anode rod substantially normal to the axis of said cylindrical cathode and situated external to and along the body of the cathode, said cathode being provided with an aperture corresponding in position to that of said rod.

5. A laser as claimed in claim 1 wherein the cathode comprises a substantially flat plate, said path extending along and adjacent a substantially flat face of said plate.

6. A laser as claimed in claim 5 wherein the anode includes an anode rod situated substantially normal to and opposite said flat face.

7. A laser as claimed in claim 3 wherein said anode rod is provided with an anode disc at the end thereof inside the envelope and coaxial with the path of said laser beam.

8. A laser as claimed in claim 1 comprising a plurality of cathodes and anodes situated along a path coextensive with the laser path.

9. A laser as claimed in claim 8 including barrier electrodes between said cathodes.

10. A laser as claimed in claim 9 wherein said barrier electrodes are substantially annular and substantially coaxial with the laser path.

11. A laser as claimed in claim 1 wherein the gaseous atmosphere comprises a mixture of from 99.5 to 95% of He and from 0.5 to 5% Ne at a total pressure in the range 10 to 80 mm. of mercury.

12. A laser as claimed in claim 11 wherein the atmosphere comprises substantially 98 to 99% He and 2 to 1% Ne at a total pressure in the range 20 to 30 mm. of mercury.

13. A laser as claimed in claim 11 wherein the means for producing a laser beam comprises at least one concave multilayer dichroic mirror having peak reflectance at a wavelength of substantially $1.153\mu$ and placed facing another mirror with a light path between these two mirrors passing through at least part of said region occupied, in operation, by the negative glow portion.

14. A laser as claimed in claim 13 wherein the mirrors are each substantially spherical concave multilayer dichroic mirrors having peak reflectance at a wavelength of substantially $1.153\mu$.

References Cited

Hartwick: "Investigation of Gas Lasers," Semi-Annual Technical Report AD289525, September 1962, 8 pages, page 5 relied upon.

RONALD L. W. BERT, Primary Examiner